US010894497B2

(12) United States Patent
Urbanick et al.

(10) Patent No.: US 10,894,497 B2
(45) Date of Patent: Jan. 19, 2021

(54) LIFTING UNIT WITH INTERCHANGEABLE ATTACHMENTS

(71) Applicants: John Urbanick, Conneautville, PA (US); Joe Urbanick, Conneautville, PA (US); Trevor Urbanick, Conneautville, PA (US)

(72) Inventors: John Urbanick, Conneautville, PA (US); Joe Urbanick, Conneautville, PA (US); Trevor Urbanick, Conneautville, PA (US)

( * ) Notice: Subject to any disclaimer, the term of this patent is extended or adjusted under 35 U.S.C. 154(b) by 0 days.

(21) Appl. No.: 16/535,877

(22) Filed: Aug. 8, 2019

(65) Prior Publication Data

US 2020/0047655 A1    Feb. 13, 2020

Related U.S. Application Data

(60) Provisional application No. 62/716,145, filed on Aug. 8, 2018.

(51) Int. Cl.
| | |
|---|---|
| *B60P 1/48* | (2006.01) |
| *B62D 33/02* | (2006.01) |
| *B66C 23/44* | (2006.01) |
| *B66C 23/00* | (2006.01) |
| *B60P 1/54* | (2006.01) |

(52) U.S. Cl.
CPC ............. *B60P 1/486* (2013.01); *B60P 1/5471* (2013.01); *B62D 33/02* (2013.01); *B66C 23/44* (2013.01); *B66C 23/54* (2013.01)

(58) Field of Classification Search
CPC ..... B60P 1/5404; B60P 1/5471; B60P 1/5461; B60P 1/5485; B60P 1/486; A01M 31/006; A01K 15/00; B66C 23/38; B66C 23/44; B66C 23/54; A22B 7/06
See application file for complete search history.

(56) References Cited

U.S. PATENT DOCUMENTS 1,464,131 A * 8/1923 Goodger ............... B60P 1/5428
  414/542
2,563,737 A * 8/1951 Nystrom ............ B62D 33/0215
  280/145

(Continued)

FOREIGN PATENT DOCUMENTS

WO   WO-2017003354 A1 * 1/2017 ............ B60P 1/5485

*Primary Examiner* — Kaitlin S Joerger
(74) *Attorney, Agent, or Firm* — Jonathan M. D'Silva; MMI Intellectual Property

(57) ABSTRACT

Utility Task Vehicles comprise a chassis, a truck body mounted to the chassis, a truck bed for holding material, and a hydraulic and/or electrical system. What is presented is a lifting unit for a Utility Task Vehicle that is factory built into the Utility Task Vehicle or an after-market add-on to the Utility Task Vehicle. The lifting unit comprises a cross-bracket mounted to the underside of the chassis and a side rail along one side of the truck body. A rotatable horseshoe hinge is mounted to the side rail. The horseshoe hinge is configured to pivot between a lower position and an upper position. An interchangeable attachment is configured to be installed on the horseshoe hinge. The interchangeable attachment could be, for example, a rock picker, a material lifting bucket, a log and bag loader, a deer skinning pole, or a hoist.

15 Claims, 4 Drawing Sheets

(56) References Cited

U.S. PATENT DOCUMENTS

| | | | | |
|---|---|---|---|---|
| 2,789,707 A * | 4/1957 | Wolf | B60P 1/486 | 414/537 |
| 2,853,198 A * | 9/1958 | Douglas | B60P 1/486 | 414/549 |
| 3,276,610 A * | 10/1966 | Thatcher | B60P 1/5428 | 414/541 |
| 4,265,585 A * | 5/1981 | Hawkins | B60P 1/5428 | 414/541 |
| 5,595,007 A * | 1/1997 | Biance | E01H 5/068 | 172/445.2 |
| 6,019,567 A * | 2/2000 | Lutkus | B60P 1/003 | 414/501 |
| 6,234,741 B1 * | 5/2001 | McDaniel | B60P 1/00 | 254/10 R |
| 6,435,806 B1 * | 8/2002 | Rinderknecht | B60P 1/483 | 212/255 |
| 6,688,837 B2 * | 2/2004 | Rinderknecht | B60P 1/483 | 212/255 |
| 6,799,935 B1 * | 10/2004 | Grollitsch | B60P 1/5428 | 414/467 |
| 7,293,951 B2 * | 11/2007 | Meeks | B60P 1/4407 | 414/462 |
| 7,300,238 B1 * | 11/2007 | James | B66C 23/44 | 414/540 |
| 7,611,320 B2 * | 11/2009 | Bell | B60P 3/41 | 144/4.1 |
| 7,992,732 B2 * | 8/2011 | Demiany | B60P 1/483 | 212/180 |
| 8,322,964 B2 * | 12/2012 | O'Brien | B60P 1/549 | 414/462 |
| 8,689,898 B2 * | 4/2014 | Benesch | E02F 3/46 | 172/829 |
| 9,290,130 B2 * | 3/2016 | Buller | B60R 9/10 | |
| 9,387,790 B2 * | 7/2016 | Seales | B60P 1/5428 | |
| 2006/0182571 A1 * | 8/2006 | Hightower | A01M 31/006 | 414/466 |
| 2019/0232850 A1 * | 8/2019 | Mistichelli | A01G 23/003 | |

* cited by examiner

LIFTING UNIT WITH INTERCHANGEABLE ATTACHMENTS

BACKGROUND

Utility Task Vehicles (UTVs), also known as side-by-sides, are commonly used on farms when a full-sized tractor is not called for. While UTVs have are excellent vehicles for a variety of tasks, there is room for improvements that can lighten the workload of the user to perform a variety of tasks that would otherwise have to be done by hand. What is presented is a lifting unit mounted to UTVs to which interchangeable attachments can be installed.

SUMMARY

Utility Task Vehicles comprise a chassis, a truck body mounted to the chassis, a truck bed for holding material, and a hydraulic and/or electrical system. What is presented is a lifting unit for a Utility Task Vehicle that is factory built into the Utility Task Vehicle or an after-market add-on to the Utility Task Vehicle. The lifting unit comprises a cross-bracket mounted to the underside of the chassis and a side rail along one side of the truck body. A rotatable horseshoe hinge is mounted to the side rail. The horseshoe hinge is configured to pivot between a lower position and an upper position. An interchangeable attachment is configured to be installed on the horseshoe hinge. The interchangeable attachment could be, for example, a rock picker, a material lifting bucket, a log and bag loader, a deer skinning pole, or a hoist. The interchangeable attachment is installed on said horseshoe hinge with any of pins, bolts, hitches, screws, or any other means.

A hydraulic cylinder is configured to actuate and pivot the horseshoe hinge between said lower position and said upper position. In various embodiments, the horseshoe hinge may be actuated by an electrical motor that may be independent or inter-connected to the electrical system of the Utility Task Vehicle. In other embodiments, the horseshoe hinge is actuated by a hydraulic that may be independent or inter-connected to the hydraulic and/or electrical system of the Utility Task Vehicle. The horseshoe hinge may be actuated by remote control.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
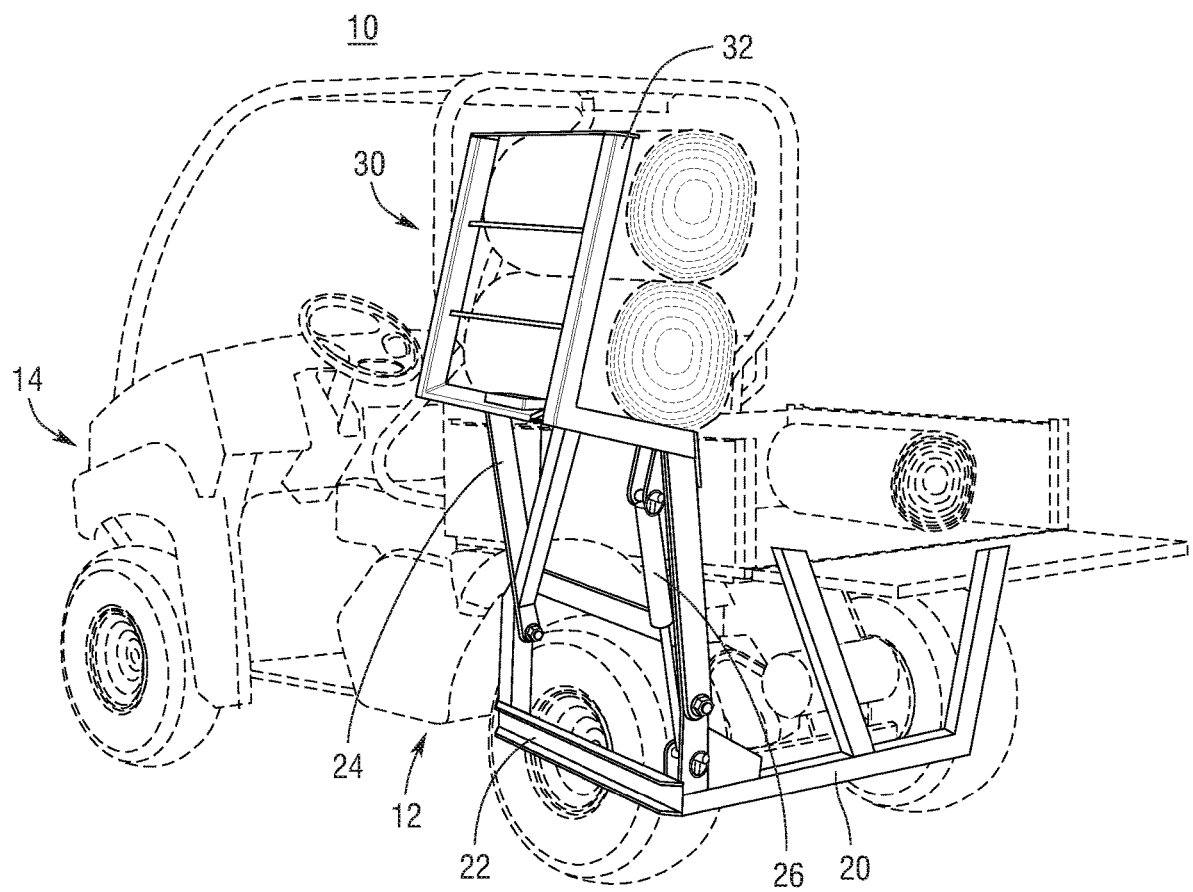
FIG. 1 illustrates a typical Utility Task Vehicle that has a lifting unit with a horseshoe hinge in the upper position with an interchangeable attachment that is a log and bag loader.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Utility Task Vehicles (UTVs) come in a variety of makes and models but in general, UTVs comprise small all-terrain vehicles that are generally all-wheel drive vehicles. FIG. 1 illustrates a typical UTV 10 that has a chassis 12, a truck body 14 mounted to the chassis 12 and a truck bed 16 for holding material. Most UTVs 10 have and a hydraulic and/or an electrical system that provides power to the various components of the UTV 10 and to be available for other uses. These are rugged vehicles that provide a lot of useful features on farms, for commercial use, and for homeowners. What is presented is a lifting unit 18 for such UTVs 10. The lifting unit 18 may be built into the UTV 10 at the factory or it maybe made available as an after-market add-on to retrofit to an existing UTV 10.

The lifting unit 18 comprises a cross-bracket 20 that is mounted to the underside of the chassis 12. This provides the lifting unit 18 with leverage and support. The cross-bracket 20 may be mounted to the chassis with bolts, screws, or other means or may be welded directly to the chassis. A side rail 22 is located along one side of the truck body 14. The side rail 22 provides the structure to which the functional components of the lifting unit 18 are mounted. A rotatable horseshoe hinge 24 is mounted to the side rail 22. The horseshoe hinge 24 is configured to pivot between a lower position shown in FIG. 2 and an upper position shown in FIG. 1. A hydraulic cylinder 26 is actuated to pivot the horseshoe hinge 24. An interchangeable attachment 30 is configured to be installed on the horseshoe hinge 24 in any manner that allows it to be swapped out with any other attachment. Examples of such mounting devices include pins, bolts, hitches, and screws but may include other devices that allow the interchangeable attachment to be removed and installed to the horseshoe hinge.

Figure 2:
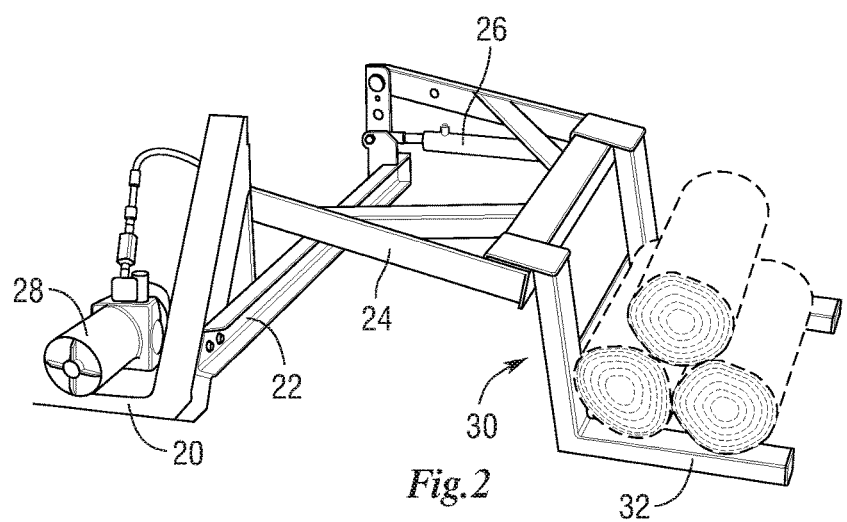
FIG. 2 is a view of the lifting unit of FIG. 1 with the horseshoe hinge in the lower position and the interchangeable attachment is a log and bag loader.

The horseshoe hinge 24 may be actuated between the lower position and the upper position by a variety of ways. FIG. 2 shows that the horseshoe hinge 24 is actuated by a hydraulic pump 28 but it could be an electric motor. The electric motor or the hydraulic pump 28 may be independent to the hydraulic and/or electrical system of the Utility Task Vehicle 10 or it may be inter-connected to the hydraulic and/or electrical system of the Utility Task Vehicle 10. The hydraulic system preferably has a working load of 250 lbs. and doesn't require any modifications to the Utility Task Vehicle 10. A cord (not shown) runs from the hydraulic pump 28 up into the cab of the Utility Task Vehicle 10, and the operator presses a button to swing the load into the truck bed 16. The actuation of the horseshoe hinge 24 may also be remote controlled.

The interchangeable attachment 30 may be any of a variety of device that increase the usefulness of the Utility Task Vehicle 10. FIGS. 1 and 2 shows an interchangeable attachment 30 that is a log and bag loader that is ideal for large heavy items such as logs, feed bags, larger game such as deer, etc. The log and bag loader attachment 30 allows the operator to load material into the loader arms 32 when the horseshoe hinge 24 is in the lower position shown in FIG. 2. The horseshoe hinge 24 could be actuated to the upper position with enough force and speed to propel the material in the loader arms 32 into the truck bed as shown in FIG. 1. Alternatively, the horseshoe hinge 24 could be left in the lower position and the Utility Task Vehicle 10 could be maneuvered to wherever the material needs to be moved to. This serves as an alternative to wheelbarrows or heavy trailers and is ideal for landscaping and groundwork.

Figure 3:
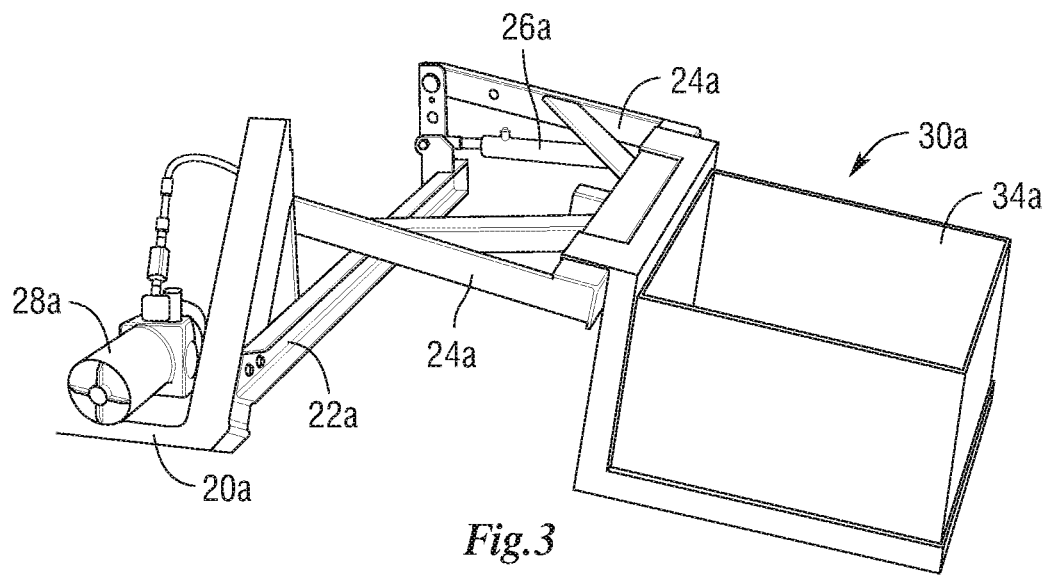
FIG. 3 is a view of the lifting unit with the with the horseshoe hinge in the lower position and the interchangeable attachment is a material bucket.

FIG. 3 shows an interchangeable attachment 30a that is a material bucket attachment that allows the operator to load material into the bucket 34a when the horseshoe hinge 24a is in the lower position. Material such as gravel, mulch, bark, soil, etc. may be shoveled into the bucket 34a. The horseshoe hinge 24a could be actuated to the upper position with enough force and speed to propel the material in the bucket 34a into the truck bed (not shown). Alternatively, the horseshoe hinge 24a could be left in the lower position and the Utility Task Vehicle could be maneuvered to wherever the material needs to be moved to. This serves as an alternative to wheelbarrows or heavy trailers and is ideal for landscaping and groundwork.

Figure 4:
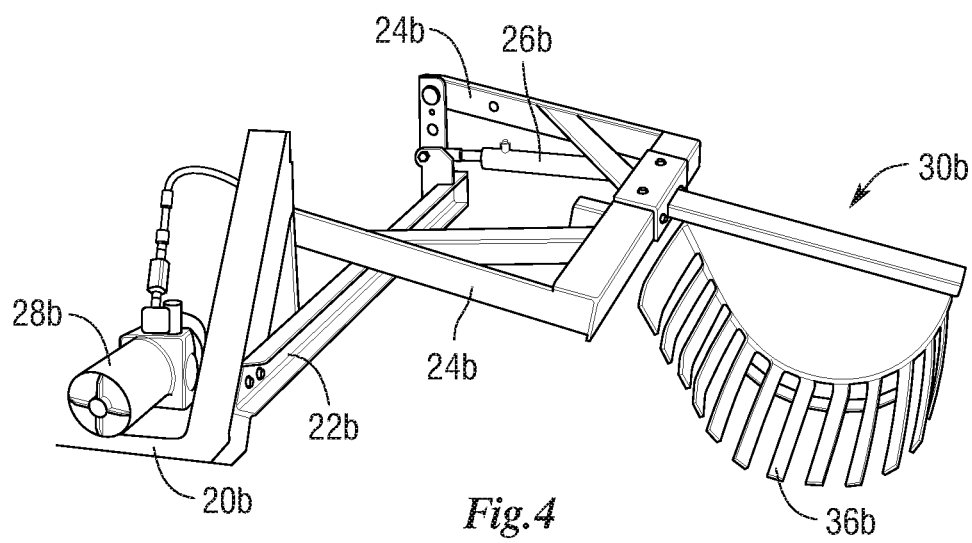
FIG. 4 is a view of the lifting unit with the with the horseshoe hinge in the lower position and the interchangeable attachment is a rock picker.

FIG. 4 shows an interchangeable attachment 30b that is a rock picker attachment that comprises a series of tines 36b arranged such that when the horseshoe hinge 24b is in the lower position, the Utility Task Vehicle can be maneuvered to dig rocks out of the ground. Once the tines 36b are worked under the rock, the horseshoe hinge 24b is actuated to move into the upper position with enough force and speed to propel the rock into the truck bed (not shown). The hydraulic cylinder 26b would have to be adjusted to enable the horseshoe hinge to lift heavy rocks and material. The space between the tines 36b allows dirt and smaller rocks to sift back to the ground as the horseshoe hinge 24b is raised. The tines 36b are configured to bend without breaking and will return to their original shape after the rock is removed to the truck bed. The tines 36b are shaped and sized to allow the operator to pick up a wide variety of rocks of different shapes and sizes. The rock picker attachment 30b could be used to pick up other items such as lumber, bags, etc.

Figure 5:
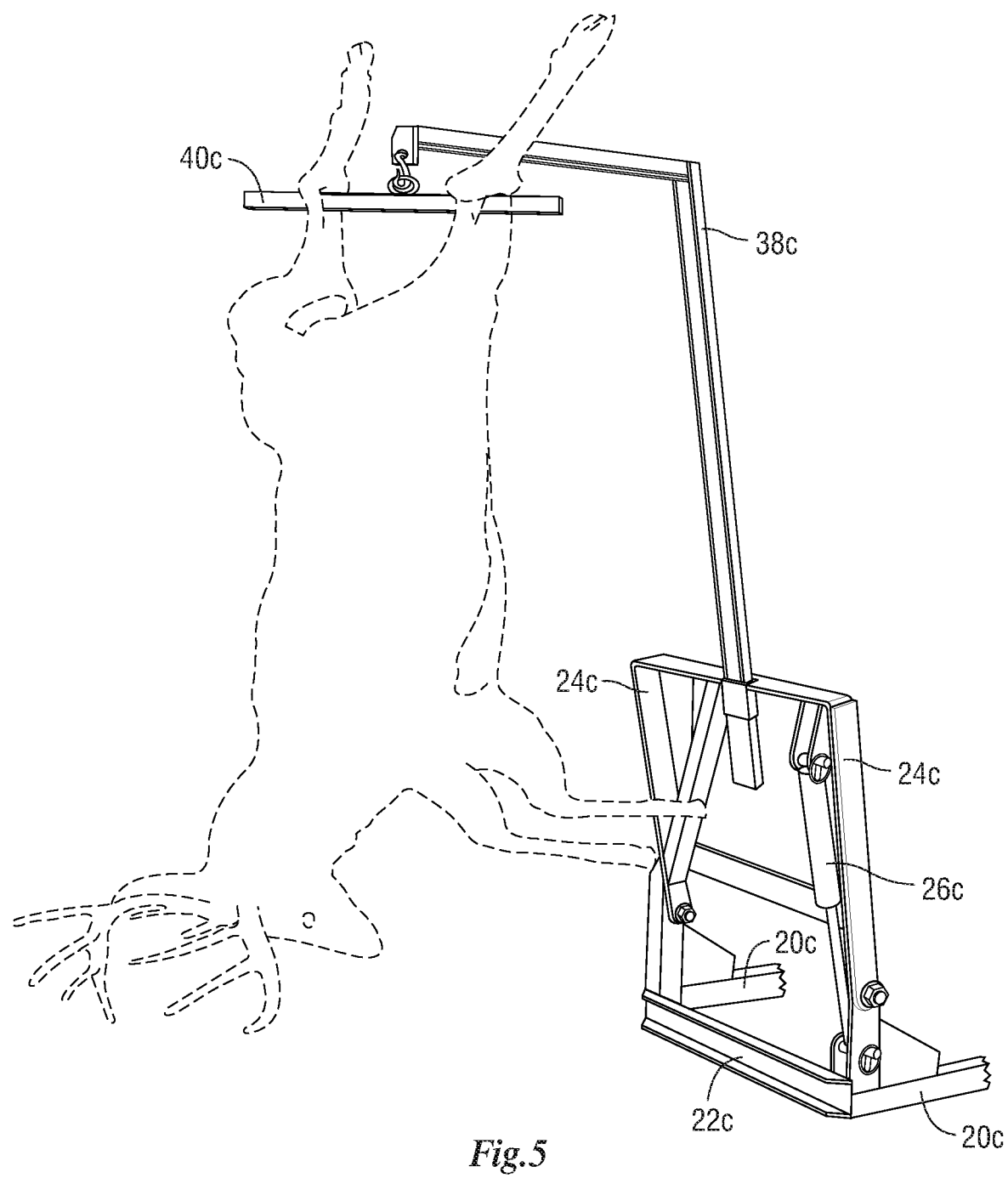
FIG. 5 is a view of the lifting unit with the with the horseshoe hinge in the upper position and the interchangeable attachment is a deer pole and yoke.

FIG. 5 shows an interchangeable attachment 30c that is a deer skinning pole 38c and yoke 40c that is intended for use by hunters or hunting lodges. To operate the pole 38c and yoke 40c, the horseshoe hinge 24c is first swung to the lower position and the yoke 40c attached to the deer then the yoke 40c attached to the skinning pole 38c. The horseshoe hinge 24c is then raised to a desired height. The hydraulic system would have to be adjusted to make sure the pole 38c moves as slow as possible. This allows deer skinning without having to bend over.

Figure 6:
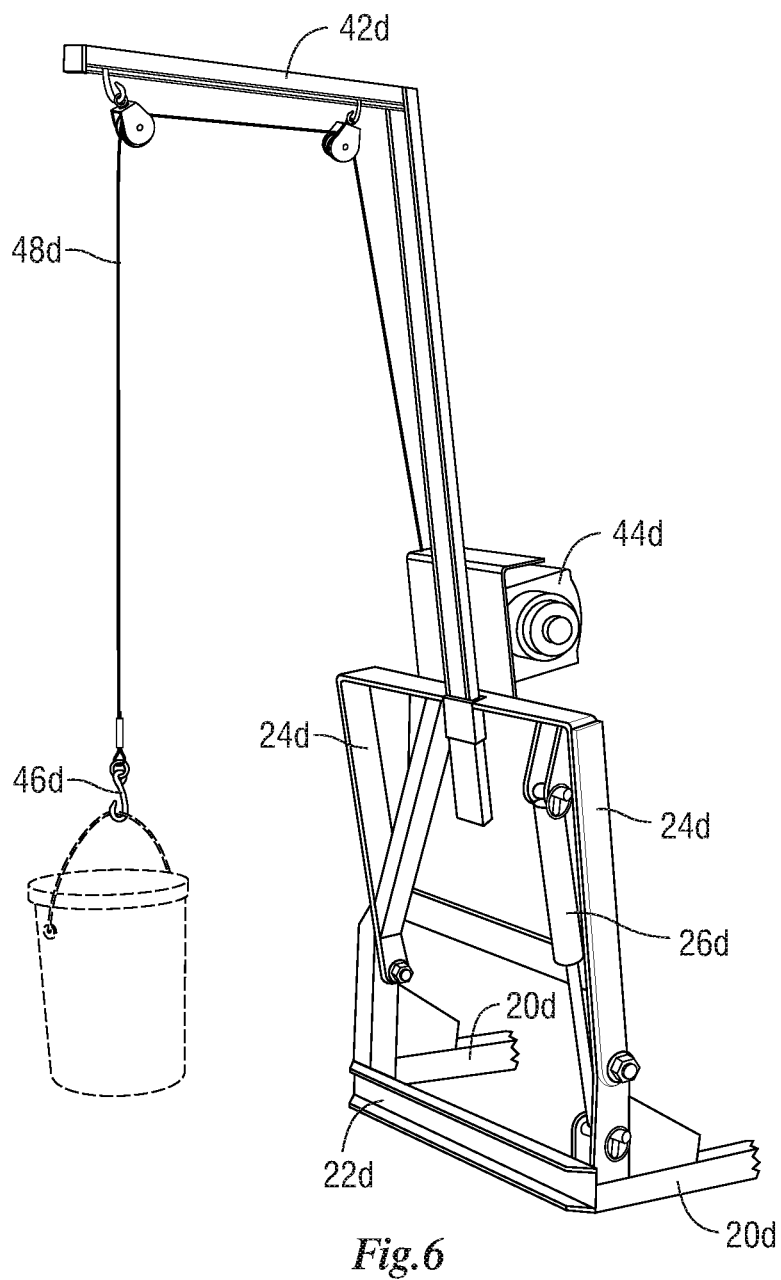
FIG. 6 is a view of the lifting unit with the with the horseshoe hinge in the upper position and the interchangeable attachment is a bucket hoist.

FIG. 6 shows an interchangeable attachment 30d that is a bucket hoist attachment. This interchangeable attachment 30d works well with anyone with a handicap or an individual not able to carry or lift buckets into the truck bed. The interchangeable attachment 30d fastens to the horseshoe hinge 24d. The hoist 42d is swiveled into position above the item to be hoisted. An electric winch 44d is provided that is used to drop a hook 46d down to the bucket or whatever else is being hoisted. Once enough cable 48d is lowered to reach the target object, the operator simply hooks it to the object. The winch 44d is then actuated to pick up the object to clear the height of the truck bed. Once over the truck bed, the hoist 42d is swiveled to position the object over the truck bed where the winch 44d is lowered to lower the object into the truck bed. This interchangeable attachment 30d could also be equipped with a standard 2-inch receiver, meaning that it would also be possible to hook this interchangeable attachment 30d into the hitch of the Utility Task Vehicle or even a standard truck receiver. The interchangeable attachment 30d also works for loading deer or wild game into the truck bed.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A lifting unit for a Utility Task Vehicle, wherein the Utility Task Vehicle comprises a chassis, a truck body mounted to the chassis, a truck bed for holding material, and a hydraulic and/or electrical system, the lifting unit comprising:
   a cross-bracket mounted to the underside of the chassis;
   a side rail along one side of the truck body;
   a rotatable horseshoe hinge mounted to said side rail, said horseshoe hinge configured to pivot between a lower position and an upper position; and
   an interchangeable attachment that is configured to be installed on said horseshoe hinge.

2. The lifting unit of claim 1 further comprising a hydraulic cylinder configured to actuate and pivot said horseshoe hinge between said lower position and said upper position.

3. The lifting unit of claim 1 further comprising said interchangeable attachment is one of a rock picker, a material lifting bucket, a log and bag loader, a deer skinning pole, and a hoist.

4. The lifting unit of claim 1 further comprising said horseshoe hinge is actuated between said lower position and said upper position by an electrical motor that is independent of the electrical system of the Utility Task Vehicle.

5. The lifting unit of claim 1 further comprising said horseshoe hinge is actuated between said lower position and said upper position by an electrical motor that is interconnected to the electrical system of the Utility Task Vehicle.

6. The lifting unit of claim 1 further comprising said horseshoe hinge is actuated between said lower position and said upper position by a hydraulic pump that is independent of the hydraulic and/or electrical system of the Utility Task Vehicle.

7. The lifting unit of claim 1 further comprising said horseshoe hinge is actuated between said lower position and said upper position by a hydraulic pump that is interconnected to the hydraulic and/or electrical system of the Utility Task Vehicle.

8. The lifting unit of claim 1 further comprising said horseshoe hinge is actuated between said lower position and said upper position by remote control.

9. The lifting unit of claim 1 further comprising said interchangeable attachment is installed on said horseshoe hinge with any of pins, bolts, hitches, and screws.

10. A Utility Task Vehicle comprising:
a chassis;
a truck body mounted to the chassis;
a truck bed for holding material;
a hydraulic and/or electrical system; and
a lifting unit that comprises:
    a cross-bracket mounted to the underside of said chassis;
    a side rail along one side of said truck body;
    a rotatable horseshoe hinge mounted to said side rail, said horseshoe hinge configured to pivot between a lower position and an upper position; and
    an interchangeable attachment that is configured to be installed on said horseshoe hinge.

11. The Utility Task Vehicle of claim 10 further comprising a hydraulic cylinder configured to actuate and pivot said horseshoe hinge between said lower position and said upper position.

12. The Utility Task Vehicle of claim 10 further comprising said interchangeable attachment is one of a rock picker, a material lifting bucket, a log and bag loader, a deer skinning pole, and a hoist.

13. The Utility Task Vehicle of claim 10 further comprising said horseshoe hinge is actuated between said lower position and said upper position by a hydraulic pump.

14. The Utility Task Vehicle of claim 10 further comprising said horseshoe hinge is actuated between said lower position and said upper position by an electric motor.

15. The Utility Task Vehicle of claim 10 further comprising said interchangeable attachment is installed on said horseshoe hinge with any of pins, bolts, hitches, and screws.

\* \* \* \* \*